L. VARBLE.
HARVESTER REEL.
APPLICATION FILED AUG. 23, 1916.
1,236,021.
Patented Aug. 7, 1917.
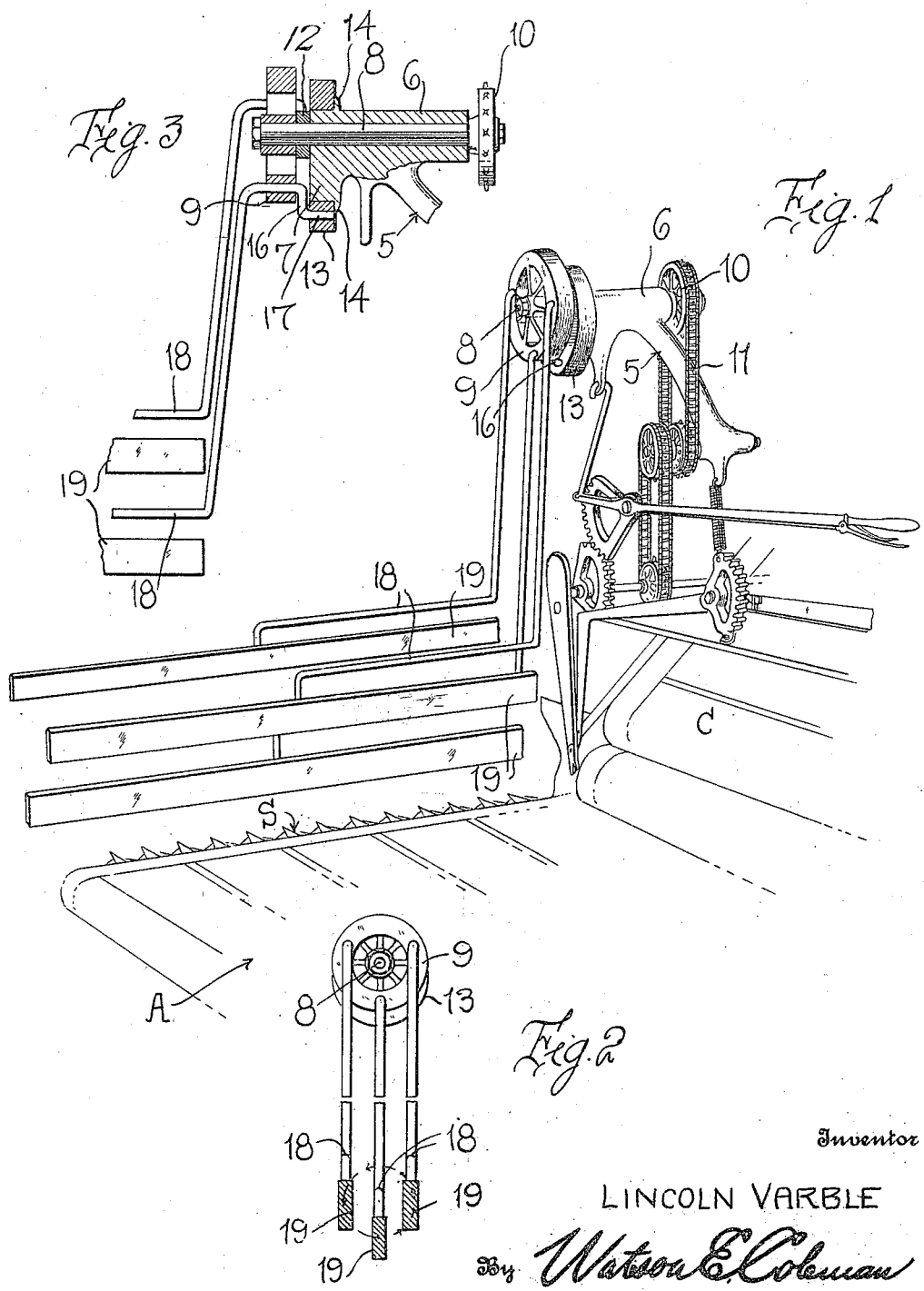
Inventor
LINCOLN VARBLE
By Watson E. Coleman
Attorney

UNITED STATES PATENT OFFICE.

LINCOLN VARBLE, OF ELDRED, ILLINOIS.

HARVESTER-REEL.

1,236,021.   Specification of Letters Patent.   Patented Aug. 7, 1917.

Application filed August 23, 1916. Serial No. 116,532.

*To all whom it may concern:*

Be it known that I, LINCOLN VARBLE, a citizen of the United States, residing at Eldred, in the county of Greene and State of Illinois, have invented certain new and useful Improvements in Harvester-Reels, of which the following is a specification, reference being had to the accompanying drawings.

This invention relates to an improved harvester reel and has for its primary object to provide a device of this character which may be readily applied to the ordinary harvester or binder and is of such construction that wheat or other grain under trees and like inaccessible places may be picked up and directed to the cutter bar of the machine.

It is another object of the invention to provide a harvester reel consisting of a plurality of independent reel slats disposed in parallel relation contiguous to the cutter bar, and means for imparting a combined rotary and vertical movement to said slats.

It is a further general object of my invention to provide a harvester reel consisting of relatively few parts which are compactly arranged, whereby the machine may be housed within a barn without necessitating the removal of the reel.

With the above and other objects in view, my invention consists in the novel features of construction, combination and arrangement of parts to be hereinafter more fully described, claimed and illustrated in the accompanying drawing, in which, Figure 1 is a perspective view of my improved reel, illustrating the same applied to a binder;

Fig. 2 is an end elevation; and

Fig. 3 is a vertical sectional view illustrating the mounting of the reel.

Referring in detail to the drawing, S designates the sickle of the harvester, and A the apron which carries the grain to the elevating conveyers C arranged at one end thereof. As the particular mechanism of the harvester and binder constitutes no part of the present invention, the same will not be further described in detail, the foregoing description sufficing for the purposes of this explanation.

A bearing casting 5 is suitably mounted upon the frame of the machine at the front side of the conveyer C, said casting being provided upon its upper end with an elongated bearing sleeve 6 on one end of which an eccentric disk 7 is integrally formed. A shaft 8 is rotatably mounted in the sleeve 6 and, at one of its ends, projects for some distance beyond the face of the disk 7. Upon this projecting end of the shaft, the disk 9 is concentrically fixed. This disk is preferably of skeletonized construction as shown in Fig. 3. To the other end of the shaft 8, a sprocket wheel 10 is secured, with which the driving chain 11 is engaged. A washer 12 is interposed upon the shaft 8 between the opposed faces of the disks 7 and 9.

Upon the disk 7, an annulus or ring 13 is loosely engaged for movement relative thereto. Stop lugs 14 are formed upon the bearing casting 5 to prevent longitudinal shifting movement of said annulus in one direction. Three rods 15 are loosely engaged in the disk 9 at equidistantly spaced points and adjacent to the periphery of said disk, each of said rods having a crank 16 formed therein between the disks 7 and 9 and the terminal of said rod laterally extended and loosely engaged in the annulus 13, as shown at 17. From the disk 9, the rods 15 extend downwardly and have their lower end portions horizontally extended, as at 18, in parallel relation upon the sickle S. The terminals of these horizontal portions of the rods are downwardly projected and, to the same, the reel bars or slats 19 are centrally fixed. These reel slats operate above and immediately in front of the sickle and, as shown in Fig. 2 of the drawing, their path of movement is comparatively limited.

In the operation of the machine, it will be understood that the shaft 8 is continuously rotated, which, in turn, rotates the disk 9 in which the upper ends of the rods 15 are mounted. As the annulus 13 is eccentrically disposed with respect to said disk, it will be understood that the crank ends 16 of said rods being mounted in said annulus will cause the latter to rotate and the rods are thus caused to rotate in the disk 9 as they are moved vertically in the rotation of the latter disk. The slats 19 on the lower ends of the rods 15 are moved through a circular path, as indicated by the arrows in Fig. 2, in a rearward direction or toward the sickle, said bars successively engaging the reclining or fallen grain as they are moved downwardly, and carrying the same to the teeth of the cutter bar, the rear slat then moving upwardly over the other two slats and again forwardly and downwardly. By the provision of such an arrangement of the reel slats having a comparatively limited path of movement, it will be seen that grain under trees or any other like places which cannot usually be reached by the ordinary binder reel, can be cut and harvested. The reel slats and operating means therefor occupies but little space on the machine so that the same does not have to be removed in moving the binder into a barn. Thus, considerable time and labor in the use of such machines may be saved.

From the foregoing description, taken in connection with the accompanying drawing, the construction, manner of operation and several advantages of my improved harvester reel will be clearly and fully understood. In view of the simplicity of the device, it will be apparent that the same can be manufactured at much less cost than the ordinary harvester or binder reel. The device can also be readily applied to the ordinary binder without necessitating any alterations in the construction thereof or materially adding to the weight of the machine. The device remaining at all times in its operative position upon the machine is ready for instant use.

While I have shown and described the preferred construction and arrangement of the several elements employed, it is to be understood that my improved reel is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. In a harvester reel, a bearing mounted above and at one side of the sickle, reel operating means supported by said bearing and including a shaft, a plurality of reel slats extending in parallel relation to the sickle and having a common rotary path of movement immediately above the sickle, the center of such rotary path being entirely below and out of coinciding relation to the operating shaft, and depending operating connections between the reel slats and said operating means.

2. In a harvester reel, a bearing, an operating shaft mounted therein, a disk fixed upon one end of said shaft, a plurality of depending rods loosely mounted in said disk, an annulus loosely mounted upon the bearing casting in eccentric relation to said disk, each of said rods having a crank operatively connected to said annulus, the lower ends of said rods being laterally extended, and a reel slat fixed to the latter end of each rod, each of said slats at all times operating in a vertical plane and in a rotary path common with the other slats above and immediately adjacent to the sickle.

In testimony whereof I hereunto affix my signature in the presence of two witnesses.

LINCOLN VARBLE.

Witnesses:
DEAN F. BUSHNELL,
ROY C. EVANS.

Copies of this patent may be obtained for five cents each, by addressing the "Commissioner of Patents, Washington, D. C."